US008744396B2

(12) United States Patent
Laccona et al.

(10) Patent No.: US 8,744,396 B2
(45) Date of Patent: Jun. 3, 2014

(54) COMPACT MODULAR UPGRADE FOR GMR SOFTWARE DEFINED TACTICAL RADIO

(75) Inventors: Dominick Laccona, Wayne, NJ (US); George M Horihan, Staten Island, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 198 days.

(21) Appl. No.: 13/467,072

(22) Filed: May 9, 2012

(65) Prior Publication Data

US 2012/0289168 A1 Nov. 15, 2012

Related U.S. Application Data

(60) Provisional application No. 61/484,049, filed on May 9, 2011, provisional application No. 61/518,722, filed on May 10, 2011.

(51) Int. Cl.
*H04B 1/034* (2006.01)
*H01Q 11/12* (2006.01)
*H04B 1/04* (2006.01)
*H04W 4/00* (2009.01)

(52) U.S. Cl.
USPC ........... 455/403; 455/99; 455/127.3; 455/430

(58) Field of Classification Search
CPC . H04B 1/3822; H04B 1/0003; H04W 84/005; H04W 84/10; H04W 84/18
USPC ......... 455/96, 99, 127.3, 127.4, 430
See application file for complete search history.

(56) References Cited

U.S. PATENT DOCUMENTS

| 7,839,169 | B2 * | 11/2010 | Murotake | 326/47 |
|---|---|---|---|---|
| 8,019,338 | B2 * | 9/2011 | Malaga et al. | 455/431 |
| 8,447,346 | B2 * | 5/2013 | Cho et al. | 455/550.1 |
| 2003/0158954 | A1 * | 8/2003 | Williams | 709/230 |
| 2003/0215373 | A1 * | 11/2003 | Reyzelman et al. | 422/186.29 |
| 2004/0151140 | A1 * | 8/2004 | Rozenblit et al. | 370/335 |
| 2009/0278599 | A1 * | 11/2009 | Pengelly | 330/124 R |

* cited by examiner

*Primary Examiner* — Simon Nguyen
(74) *Attorney, Agent, or Firm* — Maine Cernota & Rardin; Douglas P. Burum; Daniel J. Long

(57) ABSTRACT

A software-defined tactical radio solution meets the original JTRS SWaP goals by providing four complete software-defined 125 W (peak) radio channels in four modules that replace the four UT modules of the current GMR design, while retaining the GVA and NIU of the GMR. Two dual transceiver modules each include two transceivers based on OMAP processors. Two dual-channel power amplifier modules each include two 125 W (peak) amplifiers, each amplifier combining two GaN transistors combined in parallel. In embodiments, the OMAP processors include TM320C64xx DSP cores. In some embodiments, the OMAP processors are DM3730 processors. In various embodiments, each dual transceiver module includes a five Watt power amplifier. In embodiments, SINCGAR, SRW, and/or WNW waveforms are supported by software configuration. In some embodiments transceivers can be transitioned by software between waveforms.

16 Claims, 5 Drawing Sheets

COMPACT MODULAR UPGRADE FOR GMR SOFTWARE DEFINED TACTICAL RADIO

RELATED APPLICATIONS

This application claims the benefit of U.S. Provisional Applications No. 61/518,722, filed May 10, 2011 and Ser. No. 61/484,049, filed May 9, 2011, both of which are herein incorporated by reference in their entirety for all purposes.

FIELD OF THE INVENTION

The invention relates to software defined tactical radio systems, and more particularly, to upgrades compatible with the GMR tactical radio system.

BACKGROUND OF THE INVENTION

The Joint Tactical Radio System (JTRS) was originally planned to be the next-generation voice-and-data radio to be used by the U.S. military in field operations after 2010. Launched with a Mission Needs Statement in 1997 and a subsequent requirements document in 1998 (which has been revised several times), JTRS was intended to be a software-defined radio that would work with many existing military and civilian radios.

A vital component of the JTRS program was the Ground Mobile Radio system (GMR), which was targeted for replacing the 2 existing Single Channel Ground and Airborne Radio System (SINCGARS) radios currently deployed on military vehicles with a 4 channel radio that could perform SINCGARS and also key "transformational" waveforms such as soldier radio waveform (SRW) and wideband networking waveform (WNW) that were currently in development. Key constraints on GMR were that it should not exceed the Size, Weight, and Power (SWaP) of the current SINCGAR radios, and that it should have a reasonable cost per channel.

Unfortunately, the JTRS program was been beset by delays and cost overruns, particularly the Ground Mobile Radios (GMR) unit. Problems included changing requirements and unexpected technical difficulties that increased the size and weight of the unit so that it did not meet its SWaP goals, and so that it became difficult to add the required waveforms and other capabilities. Current GMR radios will not fit on turreted vehicles and are too large and expensive to field. Overheating of units during field testing has been a frequent problem. As a result, in October of 2011 the US Army announced that it planned to cancel its contract for the Joint Tactical Radio System Ground Mobile Radio.

The United States government has invested hundreds of millions of dollars in the Ground Mobile Radio (GMR). The most significant investments have been made in the Network Interface Unit (NIU) software and security architecture. Changing these would cause many years of delay in creating a new modular radio system.

What is needed, therefore, is a software-defined tactical mobile radio solution that will meet the goals of the JTRS, including the SWaP goals, while utilizing as much of the already-developed GMR hardware and software as possible, so as to capitalize on the investments that have already been made.

SUMMARY OF THE INVENTION

A software-defined tactical radio solution provides four complete software-defined radio channels, including four 100 W power amplifiers, contained in four modules that can be installed in the Ground Vehicular Adaptor (GVA) of a GMR in place of the four separate GMR Universal Transceiver modules of the current GVA design. The four modules of the present invention include two Dual Integrated Core Engine Transceiver (DICE-T) universal transceiver modules and two dual-channel 125 W (peak) power amplifier modules, thereby eliminating any need for the separate power amplifier units of the present GMR design.

By eliminating the additional GMR power amplifier units, the 36 inch "SWaP" of the existing GMR is reduced to the original goal of 16 inches. The Network Interface Unit (NIU) and the GVA of the existing GMR design are maintained, thereby leveraging the investment already made in the GMR. The new modular radio system achieves the government per-channel cost goals for a quantity of 41,000 radios. The architecture of the present invention is adaptable to almost any combination of waveforms, through provision of appropriate software for the software-defined radios. In embodiments, the software defined radio transceivers can be transitioned under software control between a plurality of waveforms.

So as to combine two universal transceivers into a single GVA-compatible DICE-T module, the present invention needed to overcome three related problems. First, the necessary components had to fit into the available space of a single GVA module. Second, the power consumption of the components had to be low enough to avoid overheating of the module. Third, the cost had to be minimized. All three problems are overcome in the present invention by utilizing an OMAP processor, which is a mobile processor that is primarily designed for and used in cellular telephones and other hand-held devices.

The term "mobile processor" is used herein to refer to a processor that is designed for use in handheld devices, and which has a total dissipated power (TDP) rating of less than 2 Watts. Some mobile processors used in embodiments of the present invention have a TDP of less than one Watt.

Conventional wisdom at the time of the invention held that mobile processors would not be suitable for tactical radio solutions, because they would lack the computational power to perform tasks that are required by tactical radios but do not apply to handheld devices, such as security, cosite interference mitigation, and filtering capabilities that allow the tactical radios to operate in a hostile environment and in close proximity to each other, as well as frequency separation that allows tactical radios to use different filter paths in transmit and receive modes. In addition, mobile processors typically include functionality such as graphical interface support that would not be used by a tactical radio, and would represent a waste of computing power.

The present invention was enabled by the realization that computing power had advanced in mobile processors, and particularly in the OMAP family of mobile processors, sufficiently far to enable them to meet the requirements of tactical radios, even though not all of the capabilities of the mobile processor would be used by the tactical radio.

By realizing that a processor intended for use in handheld devices could satisfy the requirements of a tactical mobile radio, and by using an OMAP processor to perform a task that was not foreseen by its designers, the present invention benefits from the compactness, low power consumption, and low heat dissipation that are intrinsic to handheld device processors. The invention also benefits from the low cost and reliability that OMAP processors provide, since they are manufactured in large quantities and are widely used.

In embodiments, the processor is an OMAP processor model, such as the DM3730 processor, that includes a DSP core of the TM320C64xx family. Since a DSP core of this same family is included in the GMR UT modules, the cost and risk of porting the GMR software for use with the new DICE-T dual modules was significantly reduced. In some embodiments, additional space remaining in the GVA-compatible modules is used to incorporate a dual 5 W power amplifier into each DICE-T unit.

Similar problems of space and heat dissipation are overcome by the dual-channel power amplifiers of the present invention. In particular, the four conventional power transistors and six power combiners of the GMR design are replaced in the present invention by two gallium nitride "GaN" power transistors that are much more efficient than the transistors used in the GMR power amplifiers. Before the present invention, GaN transistors were mainly used in applications such as cellular telephone towers, where space and overheating are not at issue. In these environments a single GaN transistor can be used to its maximum capacity, making it rare to combine outputs from more than one GaN.

However, in the present invention heat dissipation is an important concern. The invention overcomes this problem by combining the outputs of two GaN transistors in parallel, even though one transistor would be capable of providing 100 W. As a result, ample power is available to offset losses in the combiners as well as in spurious emission and co-site filters. And because the transistors are not operated near their design limits, heat dissipation is minimized, and the reliability of the transistors is maximized.

One general aspect of the present invention is a software-defined tactical mobile radio system that incorporates GMR components developed under the US Military JTRS program and meets the JTRS SWaP goals. The radio includes a GMR Ground Vehicular Adaptor (GVA), a GMR Network Interface Unit (NIU) installed in the GVA, two Dual Integrated Core Engine Transceiver (DICE-T) universal transceiver modules, each DICE-T module being configured for installation in the GVA in place of a GMR UT module, each DICE-T module including two software defined radio transceivers, each of the software defined radio transceivers including a core engine (CE) based on an OMAP processor, and two dual-channel 125 W (peak) power amplifier (PA) modules, each PA module being configured for installation in the GVA in place of a GMR UT module, each PA module including two 125 W (peak) power amplifiers, each of the 125 W (peak) power amplifiers including two GaN transistors combined in parallel by two power combiners.

In embodiments, each OMAP processor includes a DSP core of the TM320C64xx family. In some embodiments each OMAP processor is a DM3730 processor. In other embodiments at least one of the DICE-T modules further includes a five Watt power amplifier. In various embodiments at least one of the software defined radio transceivers can be configured by software to support the SINCGARS waveform. And in certain embodiments at least one of the software defined radio transceivers can be configured by software to support the Soldier Radio Waveform (SRW).

In various embodiments at least one of the software defined radio transceivers can be configured by software to support the Wideband Networking Waveform (WNW). And in some embodiments at least one of the software defined radio transceivers can be transitioned under software control between a plurality of waveforms.

Another general aspect of the present invention is a method for upgrading a GMR tactical radio system so that it meets the original SWaP goals of the US military JTRS program, the GMR including four UT modules installed in a GVA. The method includes removing all power amplifier units included in the GMR system, removing all four UT modules from the GVA of the GMR, installing in the GVA two Dual Integrated Core Engine Transceiver (DICE-T) universal transceiver modules, each DICE-T module being installed in place of a UT module, each DICE-T module including two software defined radio transceivers, each software defined radio transceiver including a core engine (CE) based on an OMAP processor, and installing in the GVA two dual-channel 125 W (peak) power amplifier (PA) modules, each PA module being installed in place of a UT module, each PA module including two 125 W (peak) power amplifiers, each power amplifier including two GaN transistors combined in parallel by two power combiners.

In embodiments each OMAP processor includes a DSP core of the TM320C64xx family. In some embodiments each OMAP processor is a DM3730 processor. In other embodiments at least one of the DICE-T modules further includes a five Watt power amplifier. In certain embodiments at least one of the software defined radio transceivers can be configured by software to support the SINCGARS waveform. And in various embodiments at least one of the software defined radio transceivers can be configured by software to support the Soldier Method Waveform (SRW).

In some embodiments at least one of the software defined radio transceivers can be configured by software to support the Wideband Networking Waveform (WNW). And in other embodiments at least one of the software defined radio transceivers can be transitioned under software control between a plurality of waveforms.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
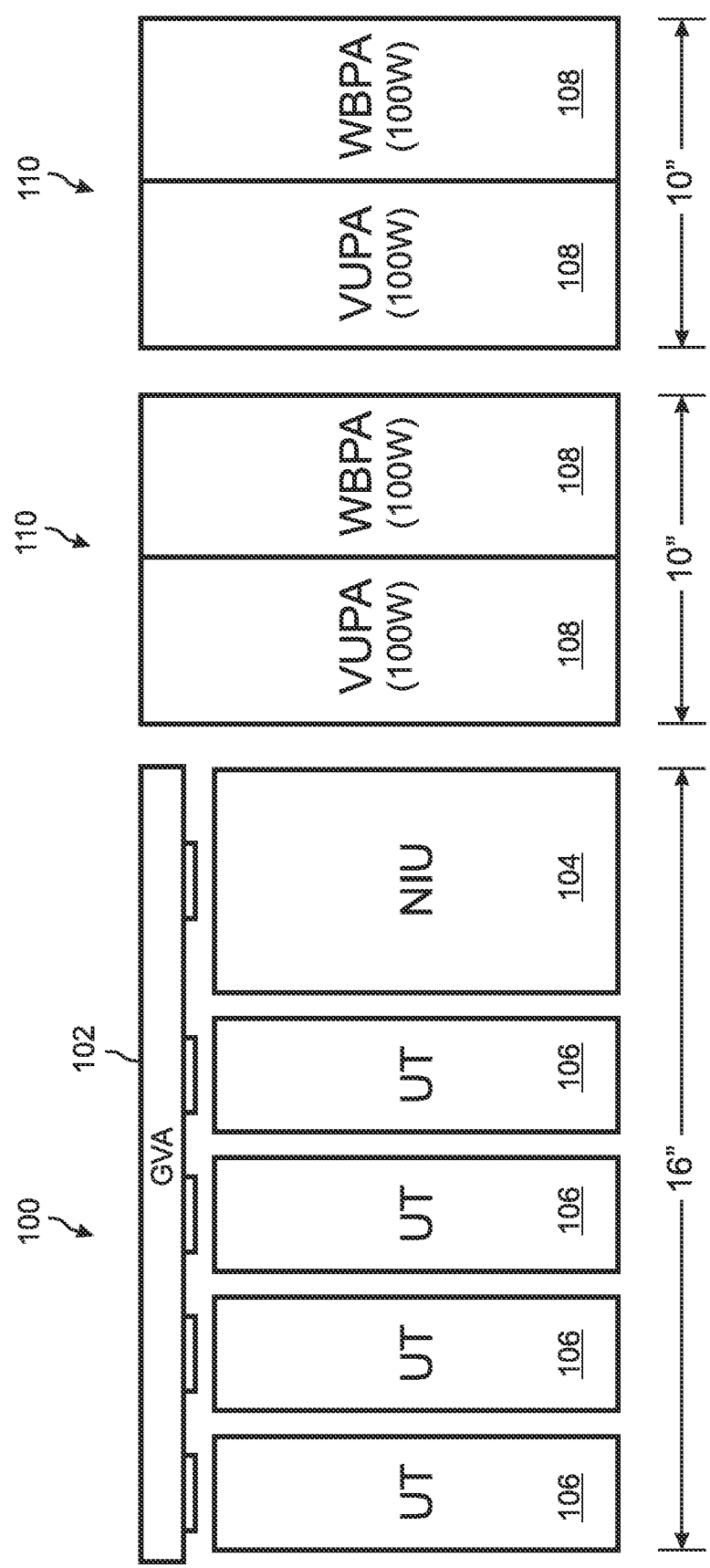
FIG. 1 is a block diagram illustrating the GMR tactical radio design of the prior art.

With reference to FIG. 1, the present GMR design of the prior art includes a main unit 100 which, by itself, consumes most or all of the SWaP in which the entire system was intended to be contained. The main unit 100 includes a Ground Vehicle Adaptor (GVA) 102 that accommodates a Network Interface Unit (NIU) 104 and four modular Universal Transceiver or "UT" modules 106, each of which provides the low power control for one radio channel. Because no more space is available in the main unit 100, the power amplifiers 108 for the system are contained in two separate amplifier racks 110, each of which contains two power amplifiers 108 having a nominal output power of 100 W each.

Taken altogether, the GMR design significantly exceeds its SWaP goals, consuming too much space and too much power, and having a tendency to overheat. Yet a significant investment has been made in the design, especially in the NIU software and security architecture.

Figure 2:
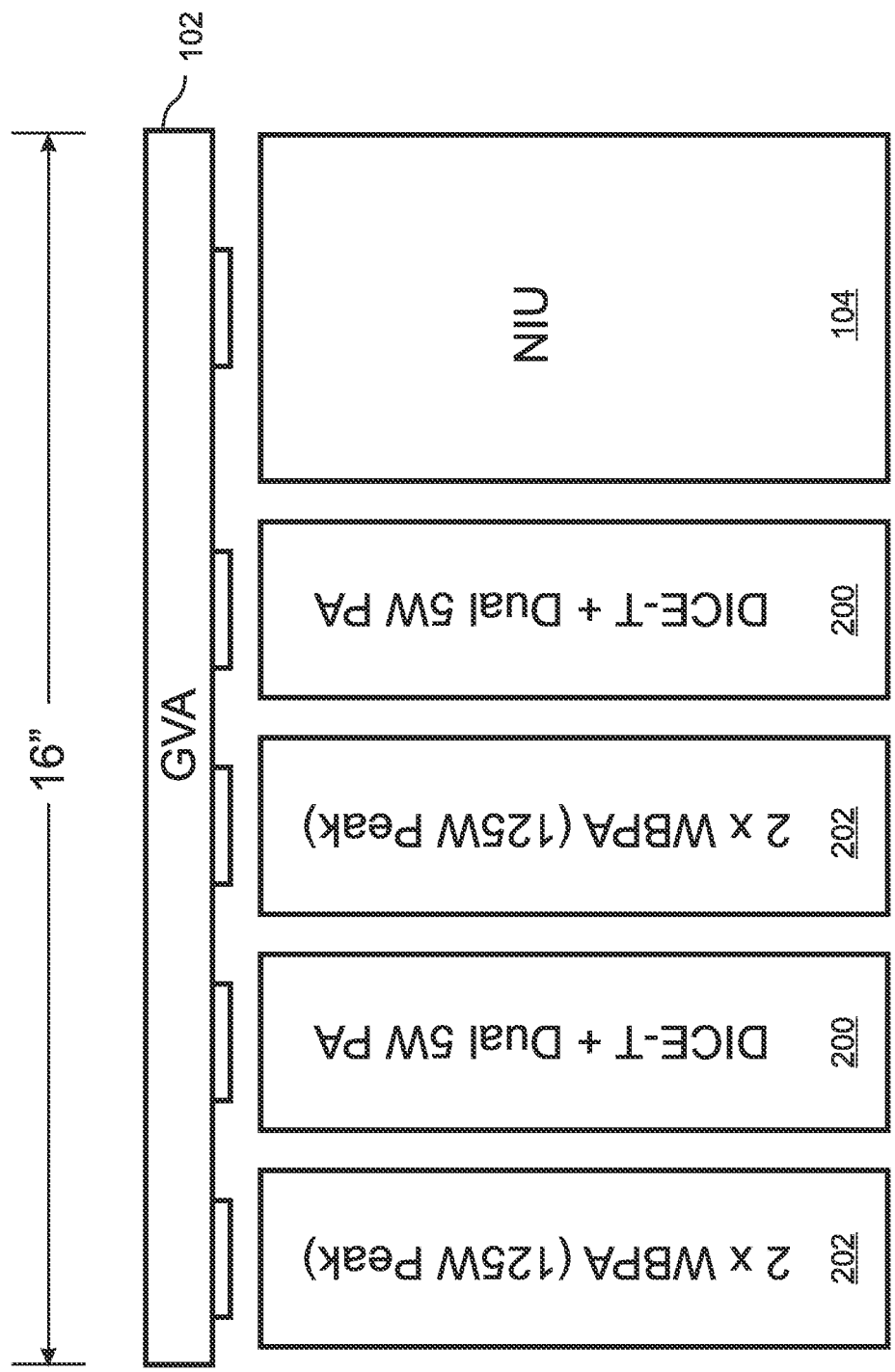
FIG. 2 is a block diagram illustrating an embodiment of the present invention.

With reference to FIG. 2, the present invention is a modular upgrade to the existing GMR design that replaces the four UT modules 106 with two Dual Integrated Core Engine Transceiver "DICE-T" universal transceiver modules 200, and two dual-channel 125 W (peak) power amplifiers 202. In each case, design of the new, compact modules was enabled by the realization that their design could be based on components that were intended for an entirely different class of applications, and had not previously been used in tactical, software-defined radios.

Figure 3:
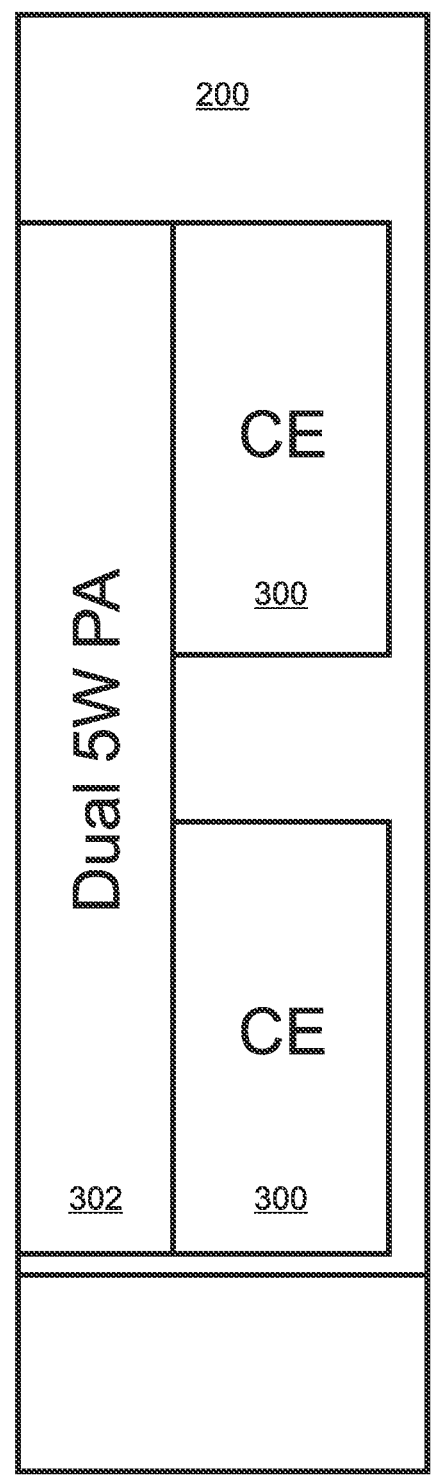
FIG. 3 is a block diagram illustrating the structure of a DICE-T in embodiments of the present invention.

In particular, with reference to FIG. 3, each DICE-T includes a core engine "CE" 300 based on an OMAP mobile processor that is designed for and used almost exclusively for cellular telephones and other hand-held devices. Because the OMAP is intended for use in hand-held battery-powered devices, it draws very little power, which allows it to be compactly incorporated into the DICE-T without overheating. In fact, considerable space remains. In some embodiments, a dual 5 W power amplifier 302 is included in the DICE-T in the space that remains unused by the CE's. The OMAP is also low in cost, due to the high volume in which it is produced, and it is well proven.

Figure 4:
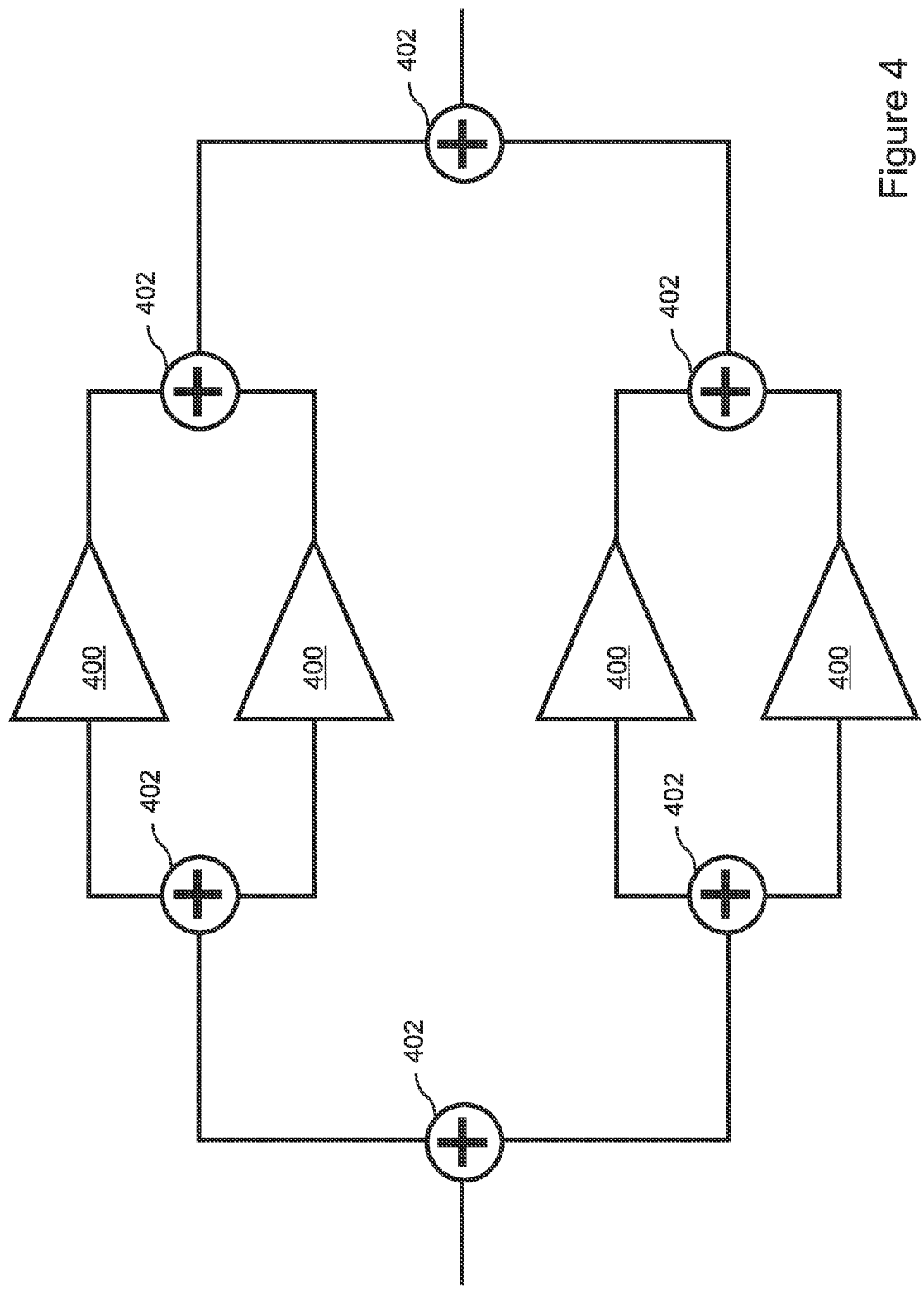
FIG. 4 is a block diagram illustrating a network of amplifying transistors and power combiners in a GMR power amplifier of the prior art.
Figure 5:
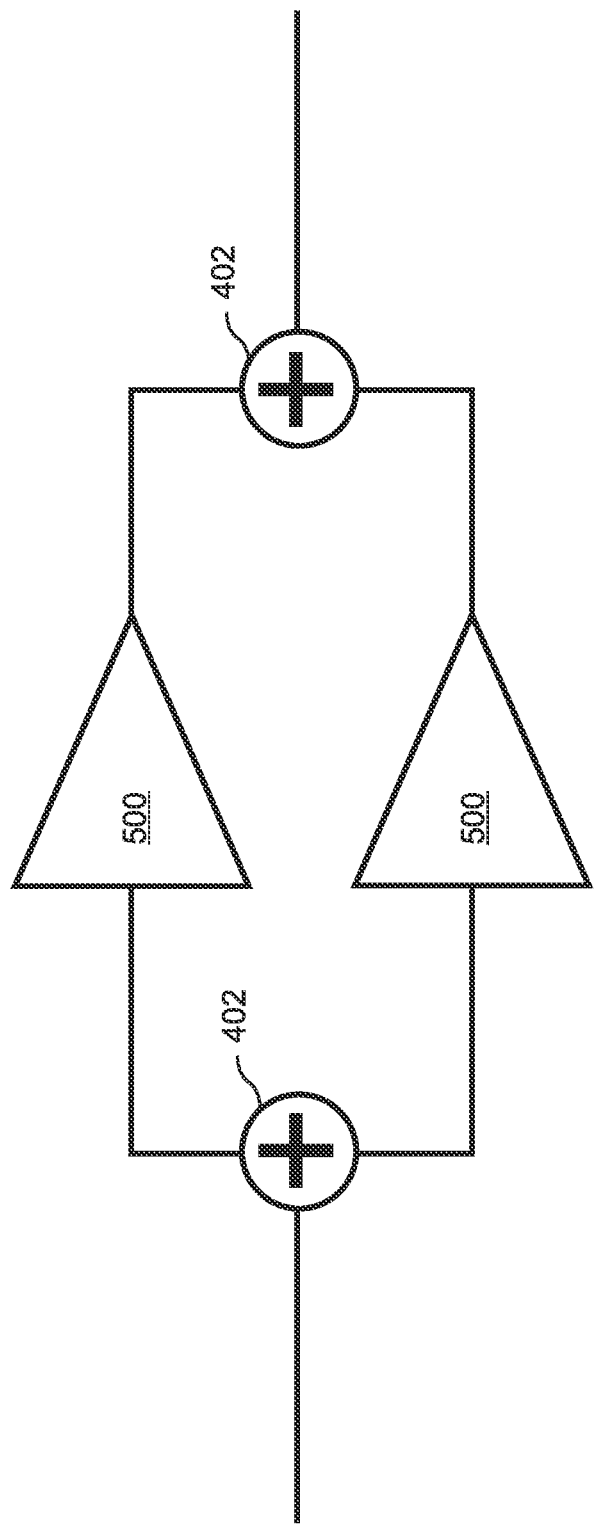
FIG. 5 is a block diagram illustrating a network of amplifying transistors and power combiners in a power amplifier of an embodiment of the present invention.

Similar problems of space and heat dissipation are overcome by the dual-channel power amplifiers of the present invention. With reference to FIG. 4, each GMR power amplifier of the prior art includes four conventional power transistors 400 and six power combiners 402. With reference to FIG. 5, in embodiments of the present invention each power amplifier replaces these four transistors 400 and six combiners 402 by only two gallium nitride "GaN" power transistors 500 and two power combiners 402.

GaN transistors are much more efficient than the transistors used in the GMR power amplifiers. They are mainly used in applications such as cellular telephone towers, where space and overheating are not at issue, thereby allowing a single transistor to be used to its maximum capacity. For this reason, combining of outputs from more than one GaN has been rare. However, in the present invention heat dissipation is an important concern. The invention overcomes this problem by combining the outputs of two GaN transistors 500, even though one transistor by itself would be capable of providing 100 W. As a result, ample power is available to offset losses in the combiners as well as losses due to spurious emission and co-site filters. And because the transistors 500 are not operated near their design limits, heat dissipation is minimized, and the reliability of the transistors 500 is maximized.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A software-defined tactical mobile radio system that incorporates GMR components developed under the US Military JTRS program and meets the JTRS SWaP goals, the radio comprising:
   a GMR Ground Vehicular Adaptor (GVA);
   a GMR Network Interface Unit (NIU) installed in the GVA;
   two Dual Integrated Core Engine Transceiver (DICE-T) universal transceiver modules, each DICE-T module being configured for installation in the GVA in place of a GMR UT module, each DICE-T module including two software defined radio transceivers, each of the software defined radio transceivers including a core engine (CE) based on an OMAP processor; and
   two dual-channel 125 W (peak) power amplifier (PA) modules, each PA module being configured for installation in the GVA in place of a GMR UT module, each PA module including two 125 W (peak) power amplifiers, each of the 125 W (peak) power amplifiers including two GaN transistors combined in parallel by two power combiners.

2. The radio of claim 1, wherein each OMAP processor includes a DSP core of the TM320C64xx family.

3. The radio of claim 1, wherein each OMAP processor is a DM3730 processor.

4. The radio of claim 1, wherein at least one of the DICE-T modules further includes a five Watt power amplifier.

5. The radio of claim 1, wherein at least one of the software defined radio transceivers can be configured by software to support the SINCGARS waveform.

6. The radio of claim 1, wherein at least one of the software defined radio transceivers can be configured by software to support the Soldier Radio Waveform (SRW).

7. The radio of claim 1, wherein at least one of the software defined radio transceivers can be configured by software to support the Wideband Networking Waveform (WNW).

8. The radio of claim 1, wherein at least one of the software defined radio transceivers can be transitioned under software control between a plurality of waveforms.

9. A method for upgrading a GMR tactical radio system so that it meets the original SWaP goals of the US military JTRS program, the GMR including four UT modules installed in a GVA, the method comprising:
   removing all power amplifier units included in the GMR system;
   removing all four UT modules from the GVA of the GMR;
   installing in the GVA two Dual Integrated Core Engine Transceiver (DICE-T) universal transceiver modules, each DICE-T module being installed in place of a UT module, each DICE-T module including two software defined radio transceivers, each software defined radio transceiver including a core engine (CE) based on an OMAP processor; and
   installing in the GVA two dual-channel 125 W (peak) power amplifier (PA) modules, each PA module being installed in place of a UT module, each PA module including two 125 W (peak) power amplifiers, each power amplifier including two GaN transistors combined in parallel by two power combiners.

10. The method of claim 9, wherein each OMAP processor includes a DSP core of the TM320C64xx family.

11. The method of claim 9, wherein each OMAP processor is a DM3730 processor.

12. The method of claim 9, wherein at least one of the DICE-T modules further includes a five Watt power amplifier.

13. The method of claim 9, wherein at least one of the software defined radio transceivers can be configured by software to support the SINCGARS waveform.

14. The method of claim 9, wherein at least one of the software defined radio transceivers can be configured by software to support the Soldier Method Waveform (SRW).

15. The method of claim 9, wherein at least one of the software defined radio transceivers can be configured by software to support the Wideband Networking Waveform (WNW).

16. The method of claim 9, wherein at least one of the software defined radio transceivers can be transitioned under software control between a plurality of waveforms.

\* \* \* \* \*